June 5, 1956  R. P. HAWKINSON  2,748,462
METHOD OF MAKING TIRE TREADING MOLDS
Filed Dec. 1, 1954
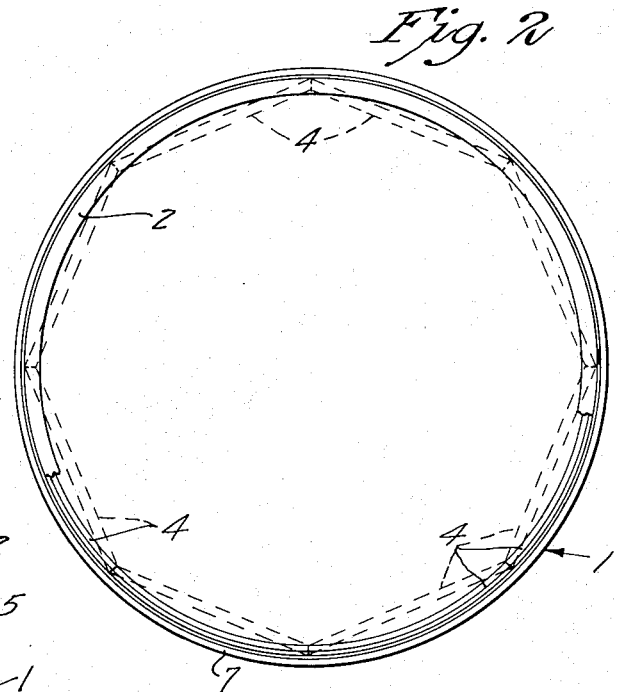
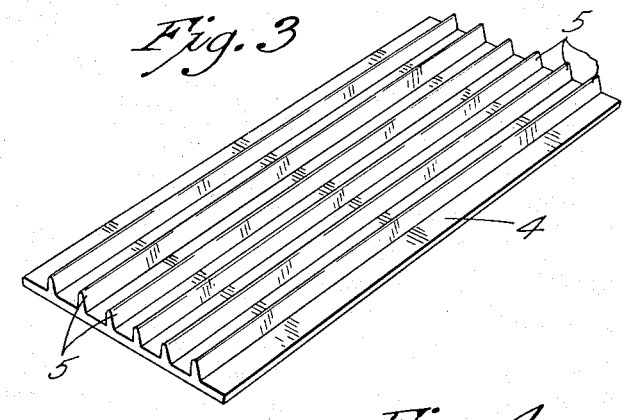
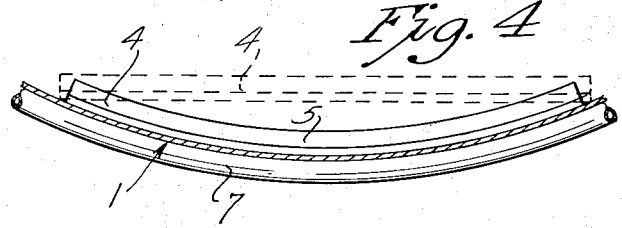
INVENTOR.
Raymond P. Hawkinson
BY
Merchant & Merchant
ATTORNEYS

United States Patent Office 2,748,462
Patented June 5, 1956

2,748,462
METHOD OF MAKING TIRE TREADING MOLDS

Raymond P. Hawkinson, Minneapolis, Minn., assignor to Paul E. Hawkinson Company, Minneapolis, Minn., a corporation of Minnesota Application December 1, 1954, Serial No. 472,300

1 Claim. (Cl. 29—505)

My invention relates to tire retreading molds or matrices, and more particularly to a novel method of forming same.

The primary object of my invention is the provision of a novel method of forming and applying tread design forming matrices to tire retreading molds whereby a great saving of time and money may be effected.

My invention is particularly adaptable to the forming of retreading molds of the type known commercially as "Hawkinson," and which include cylinder-like sheet metal bands having segmental tread design forming matrix sections secured to their interior surfaces. Heretofore these segmental matrix forming sections have been cast from aluminum or the like to the arc of the mold to which they are to be secured. This method is unsatisfactory and costly because separate matrix members must be cast for every different size or diameter mold. The object of my invention is the elimination of this costly procedure and the substitution therefor of means whereby identical cast metal matrix sections may be utilized on molds of greatly varying diameters.

The above and still further objects of my invention will become apparent from the following detailed specification, attached drawings, and appended claim.

Referring to the drawings, wherein like characters indicate like parts throughout the several views:

Fig. 1 is a view partly in vertical section and partly in front elevation of a tire retreading mold formed by my novel method;

Fig. 2 is a view in side elevation of the structure of Fig. 1 on a reduced scale and illustrating one step in the method of applying the matrix sections thereto;

Fig. 3 is an enlarged view in perspective of one of the matrix sections; and

Fig. 4 is a fragmentary view illustrating the method of securing the matrix section of Fig. 3 to the mold of Figs. 1 and 2.

Referring with greater particularity to the drawings, the numeral 1 indicates in its entirety an annular cylinder-like mold, preferably formed from sheet metal and having adjacent its marginal edges radially inwardly projecting tread material confining flanges 2, which define therebetween a mold cavity 3.

Matrix forming sections 4 are cast in relatively short flat form from aluminum or the like alloyed in a manner to permit same to be bent. An alloy of ninety five percent (95%) aluminum and five percent (5%) silicone has such physical characteristics. As shown the matrix section 4 is provided with tread design forming relief 5 which may take any desired shape.

As shown, the matrix sections 4 may have a width corresponding to the width of the cylindrical bottom 6 of the mold 1 between the flanges 2. To secure the matrix sections 4 in place, the same are placed one at a time within the mold cavity 3, as indicated by dotted lines in Fig. 2. Thereafter a rubber mallet or the like is used to cause the matrix sections 4 to conform in shape to the arcuate shape of the mold 2, see Fig. 4. The matrix sections 4 are thereafter secured in position in end to end relationship and extending completely about the mold cavity 3 by means of nut equipped bolts or the like not shown.

Preferably and as shown, heat is imparted to the exterior of the mold 2 by means of a spirally wound tubular steam pipe 7 soldered or otherwise secured to the exterior surface of the mold 2.

What I claim is:

The method of forming a tire retreading mold which comprises, forming an annular jacket having radially inwardly projecting tread material confining flanges adjacent its marginal edges which define therebetween a mold cavity, forming a plurality of relatively thin short flat matrix members from bendable cast metal, said matrix members having tread design forming relief thereon of a depth less than the depth of said confining flanges, bending said matrix members against the interior surface of said jacket intermediate said confining flanges to cause same to conform in shape thereto, and securing a plurality of said segments to said interior surface in end to end relationship.

References Cited in the file of this patent

UNITED STATES PATENTS

| 1,917,262 | Hawkinson | July 11, 1933 |
| 1,943,947 | Bungay | Jan. 16, 1934 |
| 2,591,430 | Hawkinson | Apr. 1, 1952 |
| 2,659,933 | Hawkinson | Nov. 24, 1953 |